BINARY LOGIC MODULES

Filed Oct. 9, 1961

INVENTOR
Paul M. Kintner
BY
Dennis Edmonds Morton Barrows Taylor
ATTORNEYS

INVENTOR
Paul M. Kintner
BY
ATTORNEYS

INVENTOR
Paul M. Kintner
BY Dennis, Edmonds, Morton, Barrows & Taylor
ATTORNEYS

INVENTOR
Paul M. Kintner
BY Dennis Edmonds Morton Barrows & Taylor
ATTORNEYS

INVENTOR
Paul M. Kintner
BY
ATTORNEYS

INVENTOR
Paul M. Kintner
BY Pennie Edmonds Morton Barrows & Taylor
ATTORNEYS

United States Patent Office 3,249,762

Patented May 3, 1966

3,249,762

BINARY LOGIC MODULES

Paul M. Kintner, Huntington Station, N.Y., assignor to Cutler-Hammer, Inc., Milwaukee, Wis., a corporation of Delaware Filed Oct. 9, 1961, Ser. No. 143,971
2 Claims. (Cl. 307—88.5)

This invention relates to transistor logic modules.

The modular form of construction for electronic circuits has found increasing use in recent years. Such modules are, in general, intended to perform one or a restricted number of functions and are designed to facilitate use as building blocks in a wide variety of specific applications. Transistor modules are particularly desirable due to their reliability, low power consumption, small bulk, etc.

The modules of the present invention are designed to perform binary logic functions which are widely used in computer and industrial applications. Among these are the relatively simple AND, OR, and NOT functions, as well as more elaborate functions such as multivibrators or "flip-flops," shift registers, etc. In such logic modules operation in general requires that the transistors perform a switching action from one voltage or current level to another. It is important that the switching between the two levels be performed reliably in both directions throughout a considerable range of operating conditions, such as variations in voltage supply and temperature, changes in parameters, extraneous interference, etc.

In general, the switching of transistors has required the use of power sources of both polarities in order to obtain adequately fast response and reliability. Visual status indicators such as lamps have not commonly been provided, and when provided have entailed the use of relatively expensive components, high voltages, etc.

Two power sources not only complicate the widespread use of modules in industry, but also require additional leads in the modules themselves which reduces the packing density, that is, increases the module size or reduces the number of modular units that can be put on a given size module. Lack of a visual status indicator makes check-out and maintenance of systems more difficult.

The present invention is directed to the provision of transistor logic modular units which require only a single low-voltage power supply and provide a visual status indicator in the form of a lamp, while at the same time having a minimum number of circuit components and providing satisfactory switching in both directions reliably under conditions commonly encountered in practice.

The input and output circuits of the various modular units are designed so that modules of one type can receive or actuate modules of the same or different type. Thus the input circuit of a given modular unit is designed so that a signal like that provided at the output thereof can be supplied to the input thereof and produce a proper switching action.

In general the transistors in the modules are either off (non-conducting) or on (conducting). In the on condition the transistors are driven to substantial saturation, and this requires an input base-emitter voltage exceeding a given value depending on the transistors employed. In those employed in the specific embodiments hereinafter, a base-emitter voltage in excess of about 250 millivolts is required to produce saturation current under the operating conditions given. On the other hand, when the transistor is to be turned off, the base-emitter voltage must not exceed a given low value depending on the transistor and the operating temperature. In the transistors specifically employed, a base-emitter voltage of less than about 150 millivolts is required for cutoff at normal room temperature, but not over 50 millivolts is desirable to permit operation at higher temperatures.

In the specific embodiments transistors of the PNP type are used, so that the collector is negative to the emitter and the above voltages for on and off conditions are negative voltages with respect to the emitter. With NPN transistors the polarities will be reversed, as will be understood by those in the art.

The invention will be described in connection with specific embodiments of modular units which contain particular features for accomplishing the foregoing objectives.

In the drawings:

FIGS. 1, 1*a* and 1*b* show a circuit diagram, symbol and waveforms for an AND module;

FIGS. 2, 2*a* and 2*b* are similar illustrations for an OR module;

FIGS. 3, 3*a* and 3*b* are similar illustrations for a NOT module;

Figure 6A:
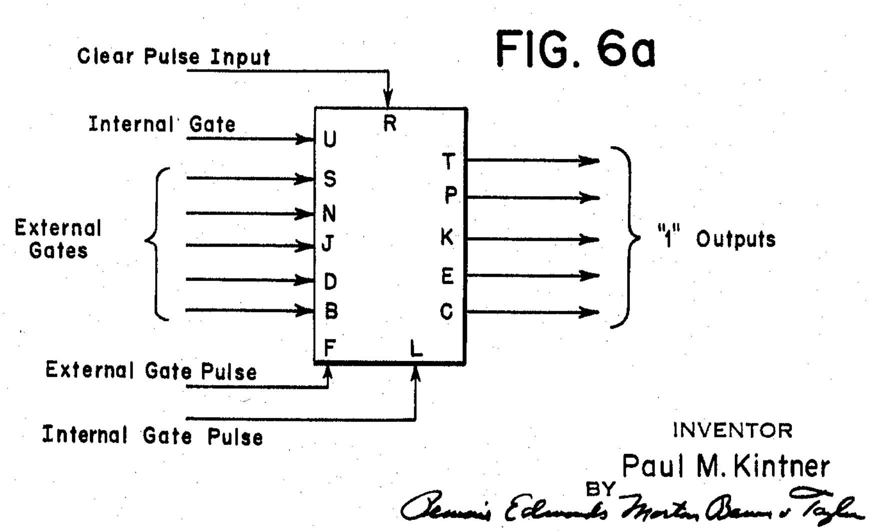
Figure 6:
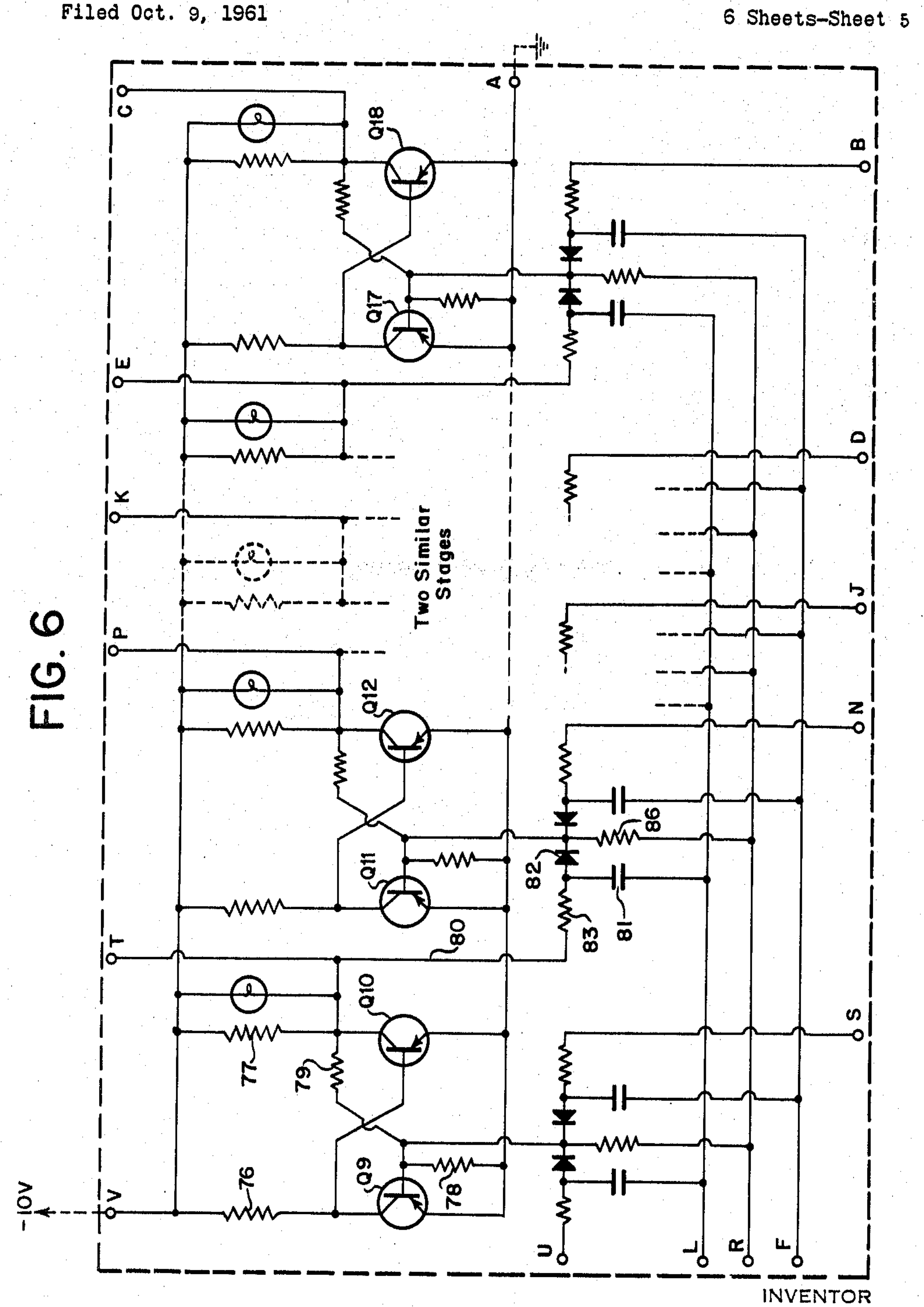
Figure 6B:
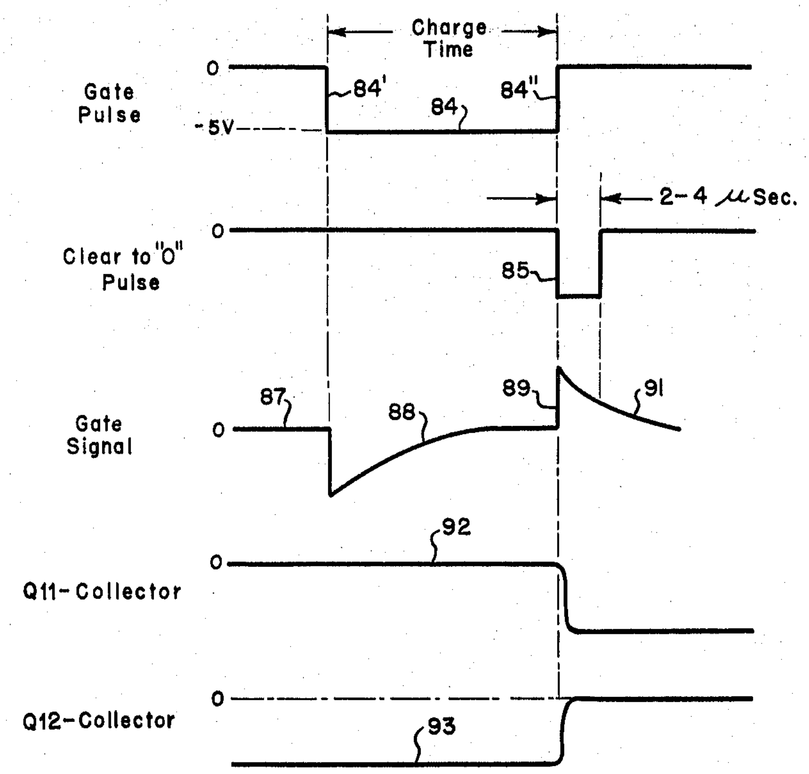

FIGS. 6, 6*a* and 6*b* are a circuit diagram, symbol and waveforms for a five-bit shift register.

Figure 1:
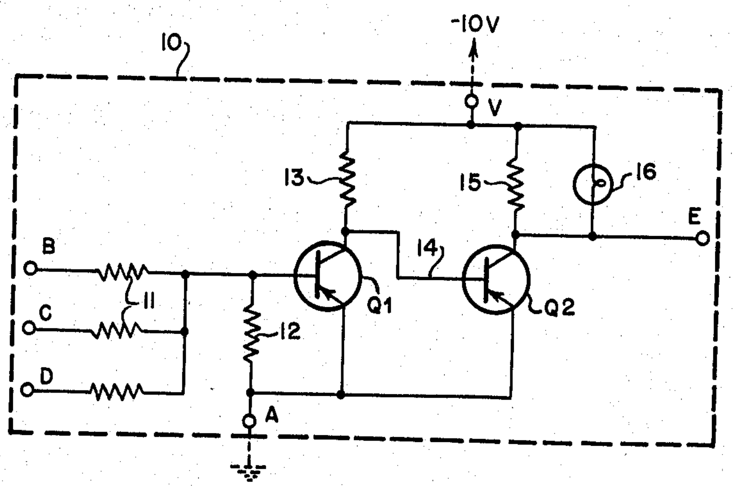
Figure 1A:
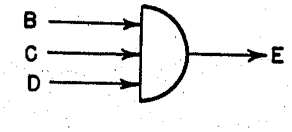

Referring now to FIG. 1 for an AND modular unit, the dotted block 10 indicates the module board. A plurality of input terminals B, C and D are provided, and one output terminal E. Terminals A and V are for the power supply. Usually more than one AND unit is provided on a given module board, for example, five per board, but only one is illustrated. Also, in this and subsequent modules the terminals are commonly brought out to a single edge of the board to facilitate connections thereto, but they are here shown at different edges to facilitate ready understanding.

PNP transistors are here employed for Q1 and Q2, so that the negative side of the power supply is connected to the collectors. Usually the emitter terminal A is grounded and a negative voltage of proper value, say −10 volts, is provided at terminal V. This is shown in dotted lines. However, if desired, the terminal V could be maintained at ground and a positive potential applied to A. In this, and subsequent modules, it will be assumed that emitter terminal A is grounded, for purposes of explanation.

With PNP transistors, a transistor will be on when the base is considerably negative to the emitter, as described above. For the off condition, the base must be only slightly negative to ground, or positive to ground.

In this particular embodiment the transistors are of the 2N404 type. To turn a transistor on, a negative voltage from base to emitter of several volts is applied. To turn it off, the negative voltage from base to emitter does not exceed about 50 millivolts in order that the transistor will turn off reliably under varying operating conditions including relatively high temperatures of say 65° C.

When the output transistor Q2 is on, the output voltage at E will be somewhat negative to ground, and is approximately 160 millivolts in this particular embodiment. When Q2 is off, the voltage at E will be several volts negative, the actual value depending on the load or loads connected to E. The input stage is designed to yield proper switching operation for applied voltages of these values.

Input voltages at B, C and D are voltage divided by series resistors 11 and shunt resistor 12, so that only a fraction of the input voltage is applied to the base of transistor Q1. Transistor Q1 is connected as a grounded emitter amplifier with a collector load resistor 13. The collector of Q1 is direct-connected to the base of Q2 by conductor 14. Q2 is also an amplifier of the grounded emitter type with a load resistor 15. The collector is connected to output terminal E. In order to indicate the state of the stage, a small incandescent lamp 16 is connected across resistor 15.

By grounding the input base resistor 12, and providing the series resistors between the input terminals and the base, when the input terminals are at or near ground potential, say in the range of 0 to −160 millivolts, transistor Q1 will be substantially non-conducting or off. Due to the direct connection to Q2, the latter will be on and hence the output voltage at E will be near ground potential. The two-stage direct coupled amplifier provides sufficient gain so that there is adequate current to light lamp 16, while at the same time providing an adequate output to drive other modules, etc.

On the other hand, when the input terminals are negative, say −5 volts or so, the base of transistor Q1 is sufficiently negative to the emitter to turn the transistor fully on. The load resistor 13 of Q1 is selected so that, when Q1 is on, the potential of the direct connection 14 is less than about −50 millivolts so that Q2 is cut off. Thus the potential at output terminal E is several volts negative.

Whenever one of the inputs B, C or D is substantially negative to ground, the base of Q1 is sufficiently negative to turn that transistor on, even though the other input terminals are at or near ground potential.

For convenience here and in the discussion of the subsequent modules, the positive voltage excursion (ground potential with terminal A grounded) will be considered to be a binary "1." A negative voltage will be considered to correspond to a binary "0." In this embodiment, it will be seen that whenever one or more of input terminals B, C, D are "0," Q1 will be on and Q2 off, thus giving a "0" output at E. However, when all input terminals are a "1," the output at E will be "1," this being an AND operation.

Figure 1B:
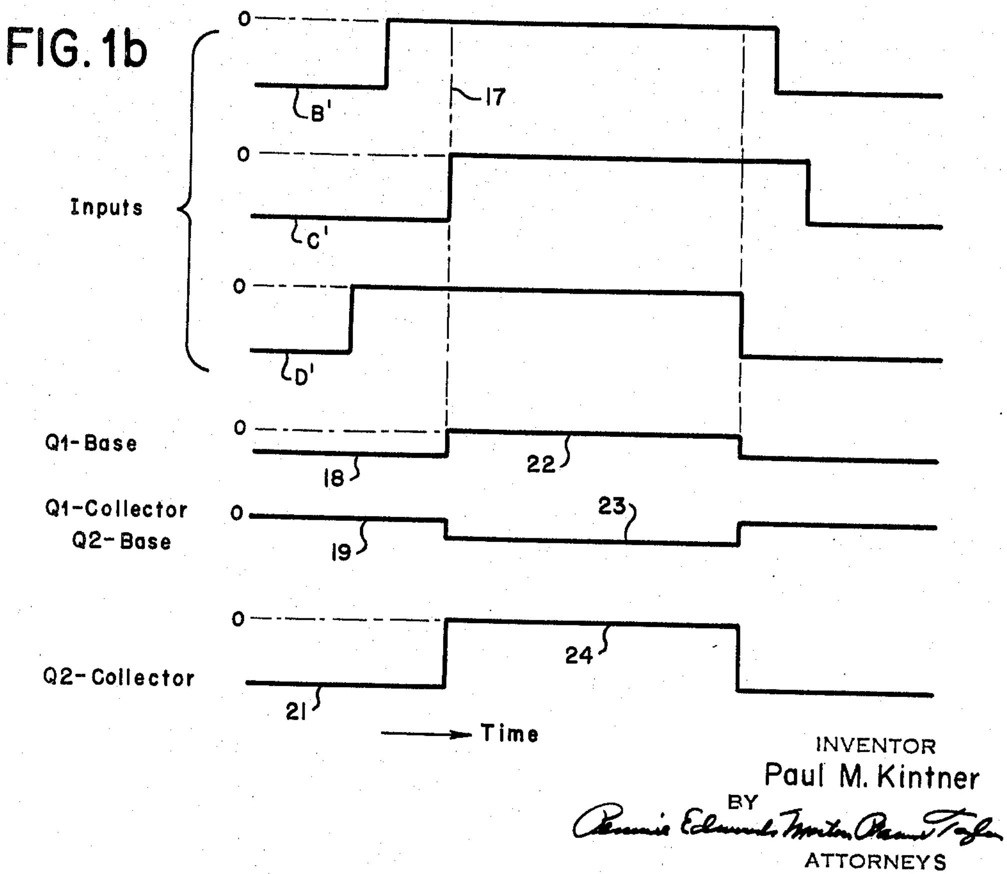

FIG. 1*b* illustrates this further. Prior to the time represented by line 17, one or more of the input potentials B′, C′, and D′ is negative to ground. Under these conditions the base of Q1 is negative, as indicated at 18, the transistor is conducting, and the Q1 collector and Q2 base are close to ground as indicated at 19. Consequently, the Q2 collector is negative as indicated at 21. However, at the time corresponding to line 17, all three inputs are at or near ground, corresponding to a "1," the Q1 base goes to ground as shown at 22, the Q1 collector and Q2 base go sufficiently negative as shown at 23 to cause Q2 to become highly conductive. Consequently, the Q2 collector is at substantial ground potential as indicated at 24, giving a binary "1" output at terminal E.

With Q2 on, lamp 16 will light since about 10 volts appears across it. With Q2 off, lamp 16 will not light, since there will be no voltage across it with the output circuit unloaded and less than 5 volts under normal load conditions.

Figure 2:
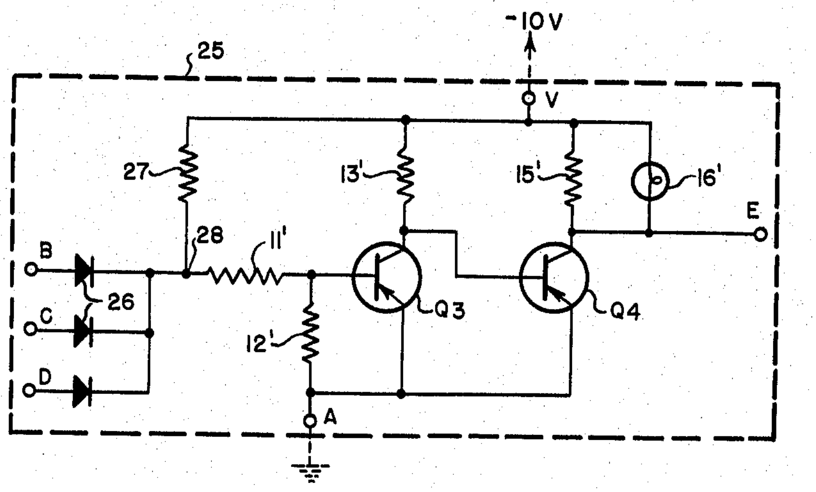
Figure 2A:
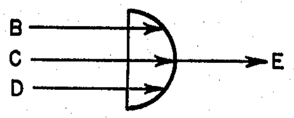

Referring now to FIG. 2, an OR unit is shown. Here again, several OR units may be mounted on a single module board 25, for example, four per module, but only one is shown. Transistors Q3 and Q4 are connected in the same manner as in FIG. 1, and resistors 11′, 12′, 13′ and 15′ function as before.

An OR unit gives a "1" output whenever any one or more of the inputs is a "1." Input terminals B, C and D are connected through respective diodes 26 to resistor 11′. The junction is connected through resistor 27 to terminal V. If all three input terminals are at the negative extreme, the voltage at point 28 will be negative, thus making the base of Q3 negative to its emitter and turning it on. This turns Q4 off and gives a negative output at E. Thus, with a "0" at each of the input terminals, a "0" is given at the output terminal.

However, if a "1" is applied to one of the input terminals, say terminal B, the corresponding diode will become highly conductive and hence of low resistance. Consequently, the voltage at point 28 will be close to ground potential, say −0.25 volt. The voltage division produced by resistors 11′ and 12′ under these conditions will cause the base of Q3 to be less than −50 millivolts negative to the emitter, thus turning Q3 off. This turns Q4 on and gives a ground potential or "1" at output E, and lamp 16′ will light.

This the presence of a "1" at any of the input terminals will give a "1" at the output terminal.

Figure 2B:
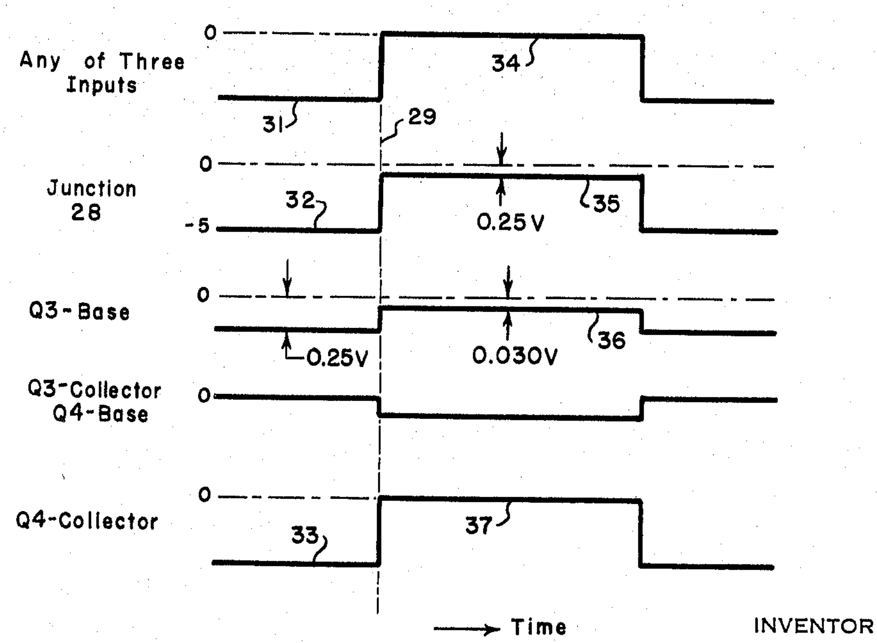

FIG. 2*b* illustrates this operation. Prior to the time represented by line 29, it is assumed that all three inputs are considerably negative as shown at 31. Under these conditions the junction point 28 is considerably negative as at 32. Consequently, the base of Q3 is sufficiently negative to cause it to be highly conductive, and the Q4 collector is negative as shown at 33.

When one of the inputs goes to ground, as shown at 34, the junction 28 is close to ground, of the order of −0.25 volt as indicated at 35. Consequently, the Q3 base is very close to ground as indicated at 36, Q3 is cut off and Q4 turned on, thus causing the Q4 collector to be at substantially ground potential as shown at 37.

Figure 3:
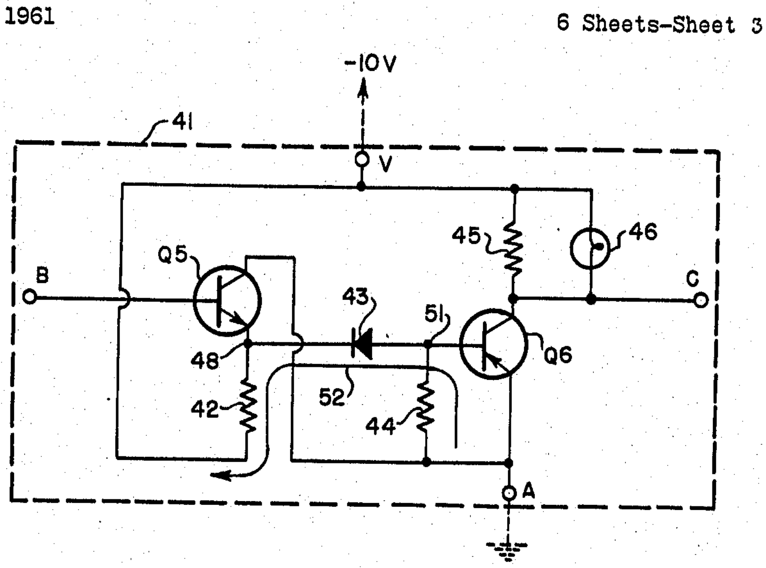
Figure 3A:
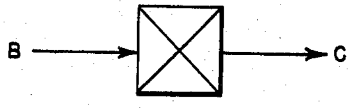

Referring now to FIG. 3, a NOT unit is illustrated. A plurality of NOT units, say five, may be mounted on a single module board 41, but only one is shown. A NOT unit is essentially a polarity inverter, a "1" input yielding a "0" output, and vice versa. The embodiment of FIG. 3 is designed to provide a comparatively large current output for a "1" output condition while at the same time insuring proper cutoff of the output transistor for the "0" output condition.

The input terminal B is direct-connected to the base of transistor Q5 which is connected as an emitter follower. To enable the same power supply to be used, Q5 is an NPN type transistor as indicated by the direction of the emitter arrow. Specifically a type 2N35/5 is used. Emitter resistor 42 is returned to terminal V, and the collector is connected to terminal A.

The emitter of Q5 is connected through a diode 43 to the base of Q6, and resistor 44 is connected between the base of Q6 and terminal A. Q6 is a PNP type transistor with the emitter connected to A and the collector connected to V through a load resistor 45. A lamp 46 shunts the collector resistor and the output is taken from terminal C.

Diode 43 is employed as a non-linear resistor in order to produce proper cutoff of Q6 for a "1" input, and a high current output from Q6 for a "0" input.

Figure 3B:
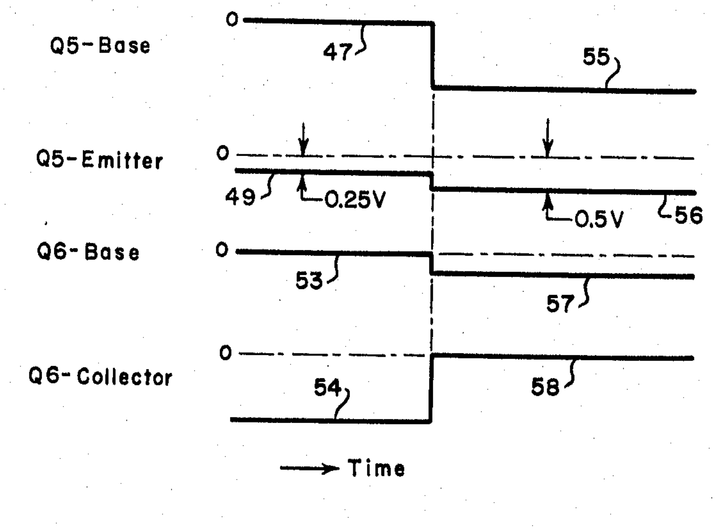

Considering first a "1" input at B, the Q5 base will be near ground potential as indicated at 47 in FIG. 3*b*. By emitter follower action, point 48 will approach ground potential, but will differ therefrom by an amount depending upon the base-emitter diode resistance of Q5. This is shown at 49 in FIG. 3*b*, and the difference between the potential at point 48 and ground may be substantially greater than that required to cut off Q6. However, due to the relatively small voltage between point 48 and terminal A under these conditions, diode 43 will present a high resistance and, with a low resistance for resistor 44, a voltage of less than −50 millivolts will be produced at point 51 and accordingly transistor Q6 will be cut off. This yields a negative output at C corresponding to a "0."

Figure 4:
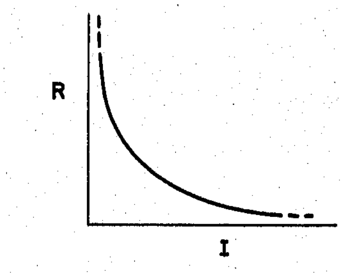
FIG. 4 is an illustrative resistance-current curve of a semi-conductor diode.

Considering the operation from another point of view, if resistor 44 has a low value, say 47 ohms which has been used successfully in practice, a voltage of less than −50 millivolts at point 51 will result in a current through resistor 44 of approximately 1 milliampere or less. Referring for a moment to FIG. 4, it will be seen that for small currents, the diode resistance will have a high value.

Returning to FIG. 3, the resultant voltage drop in diode 43 is sufficient so that point 48 may differ from ground potential by as much as −0.25 volt or so, while still maintaining Q6 cutoff.

When the input at B is a "0," the diode emitter will tend to approach the negative voltage at B, thereby tending to give a considerable negative voltage at point 48 with respect to ground. Thus a comparatively high current will tend to flow through diode 43. If the diode resistance remained high, it would limit the current that could flow from A through the emitter-base of Q6, and hence limit the collector output current of Q6 to an undesirably low value.

However, with the increase in current, the resistance of diode 43 drops to a comparatively low value so that adequate current can flow in the emitter-base path of Q6 to produce a relatively high output current at terminal C. At the same time, the low resistance of diode 43 causes the emitter-base of Q5 to cut off, and the current through diode 43 is limited by resistor 42 so that the diode will not overheat.

This can be seen by considering the current path 52. With a low resistance at 44 and a low emitter-base resistance of Q6 (which is on), the low resistance of diode 43 will act as a voltage divider with resistor 42 to terminal V. Thus the potential at point 48 will be nearer ground than the potential at B, and the emitter-base path of Q5 will be cut off. Resistor 42 will then limit the current through diode 43.

The overall action is illustrated in FIG. 3*b* where, with a "1" input at 47, the Q6 base is at substantially ground as shown at 53, and the Q6 collector is negative as shown at 54, corresponding to a "0" output. On the other hand, when the Q5 base goes negative corresponding to "0" as shown at 55, the Q5 emitter goes somewhat more negative than before as shown at 56. This causes the Q6 base to go sufficiently negative as shown at 57 to make the transistor highly conductive, the collector going to ground as at 58, corresponding to "1."

Figure 5:
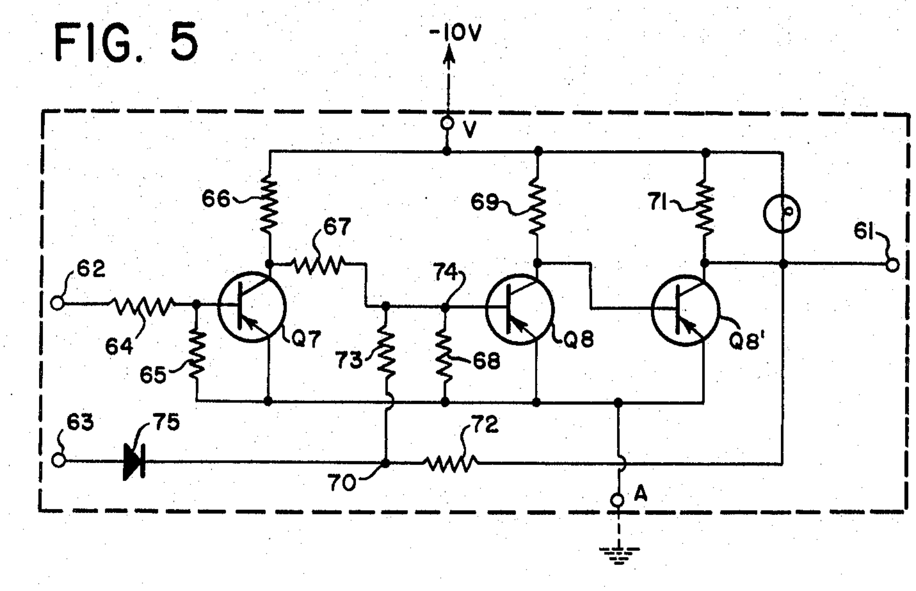
FIG. 5 is a circuit diagram of a D.-C. set flip-flop module.

Referring now to FIG. 5, a module is shown which may be termed a "D.-C. set flip-flop." This is a bistable multivibrator with provision for D.-C. setting of the output 61 to either a "0" or "1" by "1" inputs to either 62 or 63, respectively.

The input circuit at 62 is a voltage divider formed of resistors 64 and 65. The junction is connected to the base of transistor Q7 which is connected as a grounded emitter amplifier of the type described before, and functions as a polarity inverter. The collector output of Q7 is supplied to the voltage divider resistors 67 and 68, the junction being connected to the base of transistor Q8.

Transistors Q8 and Q8′ form a direct-coupled amplifier similar to Q1–Q2 of FIG. 1 and Q3–Q4 of FIG. 2. However, feedback is provided from the collector of Q8′ through resistors 72 and 73 to the base of Q8. This forms a non-symmetrical bistable flip-flop with direct coupling between the transistors and a single output at 61. When the base of Q8 is negative for a "0," the transistor is on and Q8′ is off, yielding a "0" at output 61. Since this output is negative, the feedback through 72 and 73 is negative, corresponding to the initial "0" to the base of Q8.

However, if the base of Q8 is driven substantially to ground, corresponding to a "1," Q8 will be turned off, Q8′ turned on, and the output at 61 will be near ground, corresponding to a "1."

Applying a "0" to the base of Q8 is accomplished by applying a "1" to terminal 62 to turn Q7 off. The resultant negative voltage at junction 74 will turn Q8 on, to give a "0" output at 61.

Setting the output to "1" is accomplished by supplying a "1" to input terminal 63. Diode 75 becomes conductive and causes the junction 70 to be close to ground potential. The voltage division produced by resistors 73 and 68 causes point 74 to be sufficiently close to ground to cut off Q8 and yield the desired "1" at output terminal 61.

It will be noted that the flip-flop can be changed from "0" to "1" states, and vice versa, by simply applying a "1" signal to one or the other of input terminals 62 and 63. These may be D.-C. potentials and the flip-flop will remain in a given state until a "1" is applied to the other terminal.

FIG. 6 shows a shift register module for shifting binary bits from one stage to the next in response to gating pulses. As specifically shown, five stages are provided so as to handle five bits of information. Fewer or more stages could be provided to handle a different number of bits, and two or more of the modules shown may be connected in tandem to handle more bits.

As shown, each stage contains a pair of transistors, for example, Q9 and Q10, which are D.-C. coupled with a feedback circuit of the type described for Q8 and Q8′ in FIG. 5. The first two and last stages are shown fully in FIG. 6, with the third and fourth stages incomplete since they are identical with the others. However, for clarity of explanation, the portions of the incomplete stages connected to the board terminals are shown.

In the first stage Q9 and Q10 have respective collector resistors 76 and 77, and the collector of Q9 is direct-connected to the base of Q10. Resistor 78 is connected from base to emitter of Q9 and feedback is through resistor 79. An indicating lamps is connected across resistor 77. The other stages are similar.

In shift register operation, the status of each stage is transferred to the next stage in response to an applied shift command. The shifting may cause the status of the last stage to pass out the register and allow a new status to be introduced into the first stage, or the output stage may be connected back to the input to form a ring circuit with continuous shifting around the ring for as long as desired. These operations are understood by those in the art.

As an example, suppose that the following bit pattern is present in the register:

| | | | | |
|---|---|---|---|---|
| 0 | 1 | 0 | 1 | 0 |
| (T) | (P) | (K) | (E) | (C) |

A shift command would change the pattern to:

| | | | | |
|---|---|---|---|---|
| 0 | 0 | 1 | 0 | 1 |
| (T) | (P) | (K) | (E) | (C) |

With a ring connection, the "0" state at C would be transferred to produce a "0" at T. Or, the initial "0" at C could be fed out of the register and a new bit inserted at T.

The present shift register requires only one output circuit per stage which, with terminal A grounded and terminal V connected to a minus voltage, will be close to ground potential for a "1" condition of the respective stage and several volts negative for a "0" condition. Shifting is accomplished by the use of a single gate for transferring data between stages, and direct-coupled non-symmetrical stages with individual feedback are employed. This results in a considerable reduction in the number of circuit components, while at the same time yielding high reliability and high outputs.

Shifting is accomplished by providing two input pulse signals to R and L, for the ordinary shifting operation. The gate pulse to L is a relatively long negative pulse as shown at 84 in FIG. 6*b*, and is followed immediately by a considerably shorter negative pulse at R, as shown at 85. The latter is termed the "clear" pulse input as indicated in FIG. 6*a*, and serves to change the status of all stages to "0" unless overridden by a "1" which is gated from a preceding flip-flop to the next.

For ring shifting, output C may be connected to input U. Additional modules may be connected in tandem by supplying output C of one module to input U of the next, etc. The modules may also be used to form binarydecimal counters, etc., as will be understood by those in the art.

Provision is also made for the application of external gates as indicated in FIG. 6*a*, so that any desired bit pattern may be entered into the register. Also, it permits wiring the unit to perform a number of different functions. For example, parallel gating, or placing a given bit pattern into the register with one gating action can be accomplished. The external gates may also be wired for serial shifting in the opposite direction from that normally occurring with the internal gates.

Referring to the first stage of FIG. 6, including transistors Q9 and Q10, when the flip-flop is in its "1" condition, the output T will be at ground potential. Accordingly, Q10 will be on and Q9 off. If the second flip-flop stage is in its "0" state, its output at P will be negative, Q12 will be off and Q11 on. The base of Q11 will be at a small negative voltage determined by its saturation condition.

Transfer of a "1" from one stage to the next through the internal connections is through a capacitor diode gate connecting the output of one stage with the base of the first transistor in the succeeding stage.

The capacitor-diode gate between stages 1 and 2 includes capacitor 81, diode 82 and resistor 83. In order to effect a transfer, a positive-going transient is produced by an input at L. In particular, this may be a negative pulse as shown at 84 in FIG. 6*b*. This may be termed an internal gate pulse of "clock," since it controls the transfer when utilizing the internal circuit connections.

When the pulse 84 goes negative at 84', capacitor 81 will be charged through resistor 83 from the collector of Q10, if the first stage is in the "1" state with the collector at substantially ground potential. Upon termination of the pulse at 84'', the positive-going trailing edge will couple a potential which is positive to ground through capacitor 81 and diode 82 to the base of Q11. This will turn off Q11, consequently turning on Q12 and yielding a "1" output at P.

At the end of the gate pulse 84, a "clear" pulse is applied to input R as shown at 85. This negative pulse will be coupled through resistor 86 to the base of Q11 and would tend to turn Q11 on, corresponding to a "0" output. However, the positive transient coupled through capacitor 81 overrides this negative signal, since the magnitudes are approximately equal but of opposite polarity and the impedance of diode 82 is considerably less than resistor 86. Stated otherwise, under this condition the current through resistor 86 comes from capacitor 81 rather than from the base of Q11. The clear signal 85 is made sufficiently short so that the transient from a preceding "1" stage maintains the base of the first transistor in the next stage positive until the clear signal terminates.

This operation is shown in FIG. 6*b* wherein the potential at the top of capacitor 81 prior to the gate pulse is near ground, as shown at 87. The negative leading edge 84' of the gate pulse lowers the potential at the bottom of capacitor 81, thereby causing it to charge along line 88. When the positive-going trailing edge 84'' occurs, the potential at the top of capacitor 81 rises abruptly as shown at 89, and the capacitor commences to discharge along line 91.

Waveforms 92 and 93 show the change in the collector potentials of Q11 and Q12 in going from the "0" state to the "1" upon transfer of a "1" from the preceding stage.

If the first stage were a "0" at the time of transfer, terminal T would be negative and capacitor 81 would not charge during the occurrence of the negative gate pulse 84. Consequently, the clear pulse at R would be fully effective on the second stage. If that stage were already in a "0" condition, Q11 would already be on and the clear pulse would not change this state. On the other hand, if the second stage were a "1," the clear pulse would turn Q11 on, giving a "0" output at P.

From the foregoing explanation, it will be clear that any stages of the shift register which are preceded by a "0" stage will be changed to the "0" status upon application of the gate and clear pulses. On the other hand, any stage preceded by a "1" stage will be changed to a "1" status by the transfer action.

The external gates S, N, J, D and B are connected to the bases of the first transistors in all the stages through capacitor-diode gate circuits of the type just described. If it is desired to parallel gate information into the shift register, these inputs may be used along with external gate pulses introduced at F and clear pulses introduced at R. The clear pulses may be the same as before, and the external gate pulses at F may be of the same form as that described for the internal gate pulses at L. An external gate at, say N, takes the place of the gate previously applied to that stage from the preceding stage through line 80. Consequently, the status desired for the second stage should be set at input N prior to the occurrence of the external gate pulse in F, and should persist for at least the length of the gate pulse in F. If desired, of course, input N could be maintained at a given potential, either ground or negative in a semi-permanent manner, so that stage 2 will always be a "1" or "0" as the case may be.

Serial shifting in the opposite direction may be obtained by connecting the output of one stage to the external gate corresponding to the preceding stage, as for example, P to S, etc. These and other possible operations will be clear to those skilled in the art.

As an aid to the ready practice of the invention the following specific values for the circuit components in the several modules described are given:

| | |
|---|---|
| Resistors **11, 11', 27, 64, 66, 67, 72, 73, 83** | 3.3 kilohms. |
| Resistors **12, 12', 15, 15', 42, 45, 65, 68, 71, 77, 78** | 470 ohms. |
| Resistors **13, 13'** | 1 kilohm. |
| Resistor **44** | 47 ohms. |
| Resistors **69, 76** | 820 ohms. |
| Resistors **79, 86** | 2.7 kilohms. |
| Capacitor **81** | .015 microfarads. |
| Diodes | Type 1N118. |
| PNP transistors | Type 2N404. |
| NPN transistors | Type 2N35/5. |
| Lamps | 28 volts, 40 ma. incandescent. |

It will be understood that these component values may be changed as meets the requirements of the particular application. Also, if different transistors are employed, the values may be selected for optimum results with those transistors.

The lamps are designated by their normal rating. In these embodiments they are operated far below rated voltage. Also the current rating is on a continuous basis, whereas in these applications the on-off operation makes the surge current more important. In general, it is found that the lamps have a resistance of about 80 ohms when cold, and this increases to several hundred ohms when hot. Thus the lamps form an important part of the collector loads of the transistors to which they are connected. The resistors shunting the lamps are chosen so that, in case of lamp burnout, the stages will continue to function reasonably satisfactorily.

The invention has been described in connection with specific embodiments thereof for performing specified binary logic functions. The features described may be used in combination with other components or circuits to perform other logic functions, as will be understood by those skilled in the art.

I claim:

1. A binary transistor logic modular unit comprising a pair of power supply terminals, first and second transistors of opposite types, the second transistor having the emitter thereof direct-connected to one power supply terminal and the collector thereof connected through a load resistor to the other power supply terminal, an input circuit to the base of the first transistor and an output circuit from the collector of the second transisor, an incandescent lamp connected across the collector resistor of the second transistor, the first transistor being connected as an emitter-follower with the emitter thereof connected through a resistor to said other power supply terminal and the collector thereof direct-connected to said one power supply terminal, a diode connected between the emitter of the first transistor and the base of the second, a relatively low resistor connected between the base and emitter of the second transistor, the diode being poled to pass current to switch the second transistor on and off when the first transistor is supplied corresponding switching input signals, the diode providing a relatively high resistance for the off condition of the second transistor and a relatively low resistance for the on condition thereof.

2. A modular unit in accordance with claim 1 including an input terminal direct-connected to the base of the first transistor and an output terminal direct-connected to the collector of the second transistor, the relatively low emitter-base resistor of the second transistor being predetermined with respect to said relatively high diode resistance to yield a cutoff signal at the base of the second transistor for an applied signal at said input terminal substantially equal to the collector output signal of the second transistor when the second transistor is in the on condition thereof.

References Cited by the Examiner

UNITED STATES PATENTS

| | | | |
|---|---|---|---|
| 2,524,134 | 10/1950 | Palmer | 328—206 |
| 2,580,771 | 1/1952 | Harper | 328—94 |
| 2,785,304 | 3/1957 | Bruce et al. | 329—37 |
| 2,863,955 | 12/1958 | Keonjian | 330—20 |
| 2,892,100 | 6/1959 | Haung et al. | 307—88.5 |
| 2,913,599 | 11/1959 | Benton | 307—88.5 |
| 2,931,922 | 4/1960 | Turbenis | 307—88.5 |
| 2,942,193 | 6/1960 | Tyron | 328—92 |
| 2,967,951 | 1/1961 | Brown | 307—88.5 |
| 3,010,031 | 11/1961 | Baker | 307—88.5 |
| 3,029,421 | 4/1962 | Beguin | 307—88.5 |
| 3,054,001 | 9/1962 | Chisholm et al. | 328—42 |
| 3,058,007 | 10/1962 | Lynch. | |
| 3,114,052 | 12/1963 | Rowe | 307—88.5 |
| 3,119,071 | 1/1964 | Euler | 307—88.5 |
| 3,128,412 | 4/1964 | Abromaitis | 328—206 |

FOREIGN PATENTS

| | | |
|---|---|---|
| 845,371 | 8/1960 | Great Britain. |

ARTHUR GAUSS, *Primary Examiner.*

B. P. DAVIS, *Assistant Examiner.*